Jan. 21, 1969

C. G. DEWEY

3,423,664

MEANS FOR SUPPRESSING COMMUTATION TRANSIENTS IN A CONTROLLED
RECTIFIER CONVERTER FOR HIGH-VOLTAGE ELECTRIC
POWER APPLICATIONS

Filed May 24, 1967

INVENTOR:
CLYDE G. DEWEY,
BY Albert S. Richardson Jr
ATTORNEY

Jan. 21, 1969  C. G. DEWEY  3,423,664
MEANS FOR SUPPRESSING COMMUTATION TRANSIENTS IN A CONTROLLED
RECTIFIER CONVERTER FOR HIGH-VOLTAGE ELECTRIC
POWER APPLICATIONS
Filed May 24, 1967  Sheet 2 of 5

INVENTOR:
CLYDE G. DEWEY,
BY Albert S. Richardson Jr
ATTORNEY

INVENTOR:
CLYDE G. DEWEY,
BY Albert S. Richardson Jr.
ATTORNEY

INVENTOR:
CLYDE G. DEWEY,
BY Albert S. Richardson Jr.
ATTORNEY

United States Patent Office 3,423,664
Patented Jan. 21, 1969

3,423,664
MEANS FOR SUPPRESSING COMMUTATION TRANSIENTS IN A CONTROLLED RECTIFIER CONVERTER FOR HIGH-VOLTAGE ELECTRIC POWER APPLICATIONS
Clyde G. Dewey, Drexel Hill, Pa., assignor to General Electric Company, a corporation of New York
Filed May 24, 1967, Ser. No. 640,987
U.S. Cl. 321—11                13 Claims
Int. Cl. H02m 1/18

ABSTRACT OF THE DISCLOSURE

High-voltage electric power inverters and rectifiers can be formed by appropriately interconnecting and sequentially firing a plurality of electric valves each comprising a plurality of individual semiconductor controlled rectifiers that are turned on in unison when that valve is fired. To ensure successful operation of the controlled rectifiers in each valve during periods of commutation, I provide in series therewith additional means for initially absorbing and later dissipating electrostatic energy stored in the power system when commutation begins.

---

My invention relates generally to electric current switching circuits that are useful in high-voltage static power converters of the kind that can be operated alternatively in either a rectifying mode (converting A-C to D-C) or an inverting mode (reconverting D-C to A-C). Where two such converters are furnished at opposite ends of a high-voltage D-C link, bulk electric power can be economically transmitted via underground or submarine cables or, for very long distances, by overhead lines, or power can be advantageously interchanged between two proximal A-C systems of different or nonsynchronous frequencies.

In the present state of the high-voltage electric power conversion art, as is explained in a book by Colin Adamson and N. G. Hingorani entitled High Voltage Direct Current Power Transmission (published in 1960 by Garraway, Ltd., London, England), switching is ordinarily accomplished by electric valves comprising high-voltage, heavy-current, grid-controlled mercury-arc tubes. Typically six such valves are arranged in a 3-phase double-way bridge configuration having three separate A-C terminals and a set of positive and negative D-C terminals. By sequentially firing the six valves in the proper order and in synchronism with the voltages of the 3-phase electric power system to which the A-C terminals of the bridge are connected, the flow of power between the A-C and D-C terminals can be controlled as desired.

The time at which a valve is fired, measured in electrical degrees from the cyclically recurring instant at which its anode voltage first becomes positive with respect to cathode, is known as the "firing angle." As the firing angle is increased from zero (no phase retard), the average magnitude of the rectified voltage between the positive and negative D-C terminals decreases from its maximum positive level. As the firing angle approaches 90 degrees, the average D-C voltage reverses polarity and the bridge commences to operate in its inverting mode, whereby power can be transmitted from the D-C to the A-C terminals.

In the foregoing setting, forward current conduction in a valve is stopped at the end of its conducting interval each cycle by line voltage commutation. "Commutation" is the name given the definite transfer of load current from one valve (the relieved or "outgoing" valve) to the next-conducting valve (the relieving or "incoming" valve). During a period of commutation, also known as overlap time, current in the incoming valve rises from zero to full load and current in the outgoing valve falls from full load to zero, and while both valves are thus conducting, two phases of the A-C system are effectively short-circuited. Current in this short circuit is limited principally by the A-C system and leakage inductances.

While high-voltage converters of the foregoing type have operated successfully in practice, their mercury-arc tubes have certain drawbacks that could be eliminated if replaced by solid-state switching devices of the multilayer semiconductor type. A device of the latter type (hereinafter referred to as an SCR, but also known generally as a silicon-controlled rectifier or a thyristor) typically comprises a thin, broad area disc-like body of silicon having three back-to-back PN (rectifying) junctions between a pair of main current-carrying electrodes (anode and cathode). The silicon body is mechanically sealed in an insulating housing and electrically connected to an external power circuit by way of its anode and cathode, and it is provided with suitable means for initiating conduction between these electrodes on receipt of a predetermined control signal.

When connected in series with a load impedance and a source of forward bias voltage, an SCR will ordinarily block appreciable current flow between its anode and cathode until triggered or "fired" by the application thereto of a control signal (gate pulse) above a small threshold value, whereupon it abruptly switches from a high resistance to a very low-resistance, forward conducting (turned on) state. Subsequently the device reverts to its non-conducting (turned off) state in response to through current being reduced below a given holding level. Hereinafter, the instantaneous main current flowing through the SCR between its anode and its cathode will be referred to as the anode current $i$, and the instantaneous potential difference between the anode and the cathode will be referred to as the anode voltage $v$.

In recent years SCR's have been popularly used in low-voltage (e.g., under 1,000 volts) high-power rectifiers and inverters. Their inherent advantages over mercury-arc tubes are well known. Perhaps their most important feature is reproducibility, that is, absence of random phenomena which cannot be either predicted or controlled. SCR's do not exhibit the objectionable random phenomena of mercury arc rectifiers such as arc-backs, plasma instability which can lead to abnormal overvoltages, and variations of arc behavior near current zero. Another important advantage of SCR's is their insensitivity to environmental conditions. They require neither accurate temperature control nor monitoring of their condition during operation. Since they are hermetically sealed in the factory and ready to be energized, they require no on-site assembly and conditioning. These important advantages account for the simplicity in design and operation, the ease of maintenance, and the high reliability of SCR converters.

However, in order to use SCR's in high-voltage converters, a number of new problems must be faced and solved.

(1) Individual SCR's commercially available today have forward and reverse blocking voltage ratings that are still much lower than required for very high-voltage applications. Fortunately, however, it has proven feasible to operate a plurality of SCR's in series for voltages exceeding their individual blocking capabilities, whereby the full system voltage is almost equally divided and shared by the respective devices of lesser rating.

(2) It is not presently practical to mass produce high-power SCR's having precisely matching characteristics, particularly their switching characteristics. Therefore, during a switching operation of a solid-state valve comprising a string of SCR's in series, the transition between blocking and conducting states of all devices in the string is not likely to occur simultaneously. For example, during the transition from conducting to blocking states at the end of commutation, some of the SCR's in the string will probably turn off slightly earlier than others and therefore attempt to interrupt whatever current is then flowing. Because the full system voltage is available to drive this current, actual interruption cannot be successfully accomplished at this time. The problem can be solved, however, by paralleling the respective SCR's of the string with a voltage dividing R-C bypass network that will accept current for a few microseconds until additional devices go into their blocking states. The need for such a bypass network to force transient and steady-state voltage sharing is explained on pp. 359–61 of a book by F. E. Gentry et al. entitled Semiconductor Controlled Rectifiers (published in 1964 by Prentice-Hall, Inc., Englewood Cliffs, New Jersey).

(3) The maximum current ratings of typical high-power SCR's that are commercially available today may be inadequate to meet the needs of high-voltage converters. In this event, it is possible to form a higher current valve by arranging individual SCR's in parallel, and to increase the current rating of a converter by paralleling bridges.

(4) SCR's have very critical temperature limitations. If allowed to become overheated internally, an SCR can be permanently damaged. To avoid this problem, it is important that the SCR be provided with efficient heat dissipating means and that the external circuit in which it is used be so designed that the maximum magnitude of anode voltage $v$ imposed on the device will never exceed its rated limit. The magnitude of anode current $i$ that an SCR can carry without damage depends primarily upon the temperature produced by the resultant energy dissipation ($\int vidt$) and is therefore an inverse funtion of conducting time and also of the instantaneous resistance $v/i$. It is particularly important during the turn-on process, when the resistance of the device is in transition from high to low values, to avoid subjecting an SCR to more current than it can safely tolerate, and toward this end saturable reactors or the like are sometimes connected in series with the SCR to limit the initial rate of rise of anode current (the inrush current slope, or $di/dt$).

The prior art practices reviewed above are not alone sufficient to enable SCR's to be safely used in the valves of a high-voltage converter. When such a valve is triggered at a relatively late firing angle, commutation begins with the relevant phase-to-phase voltage E of the A-C system near its crest magnitude. At this point in time there is an extra high level of energy ($\frac{1}{2}CE^2$) stored in the stray capacitance C of the connected system, and unusually severe commutating transients can be expected. Even if this quantity of stored energy were within the aggregate energy-dissipating capabilities of the string of serially connected SCR's comprising the incoming valve, the situation is potentially unsafe because of the propensity of some of the individual SCR's to turn on slightly earlier than others. The energy-dissipation duty imposed on the slowest SCR could far exceed its rating and cause its failure. Another potential problem is that commutation transients can cause initially forward current in the SCR's to oscillate to zero and reverse, thereby prematurely quenching the valve. Accordingly, other means is needed to suppress commutation transients, and a principal object of my present invention is to provide such means, without interfering with successful switching by the valve.

Another objective is to provide a high-voltage solid-state switching circuit having efficient, reliable, and quick-acting commutation transient suppression means.

In carrying out my invention in one form, I connect a saturable core inductor in series with a plurality of simultaneously triggered SCR's to form a solid-state switching circuit adapted to be connected to an A-C electric power system. The SCR's are arranged to freely conduct electric current in a given direction through this circuit when triggered. Initially I shunt the inductor with a resistance-inductance circuit whose inductance component in cooperation with the saturable core inductor will limit $di/dt$ to a value which the SCR's can safely tolerate. The total resistance in the shunting circuit has an underdamping ohmic value, and consequently it will have negligible effect in the relatively short interval required for current in this circuit to reach its peak, corresponding to nearly complete discharge of the stray capacitance of the A-C system. After the magnitude of current in the shunting circuit attains a peak, I provide a relatively low-impedance path across part of this circuit, which part includes the whole inductance component and a predetermined portion of said resistance. The electric energy previously absorbed by the inductance component will be subsequently dissipated in said portion of said resistance. Now the saturable core inductor is effectively shunted by only the remaining resistance which has an overdamping ohmic value, and the switching process can proceed without adverse oscillations between the inductor and the system capacitance. Soon the inductor core saturates, and continued rise of current in the switching circuit will be limited primarily by the inductance of the connected system.

My invention will be better understood and its various objects and advantages will be more fully appreciated from the following description taken in conjunction with the accompanying drawings in which.

Figure 1:
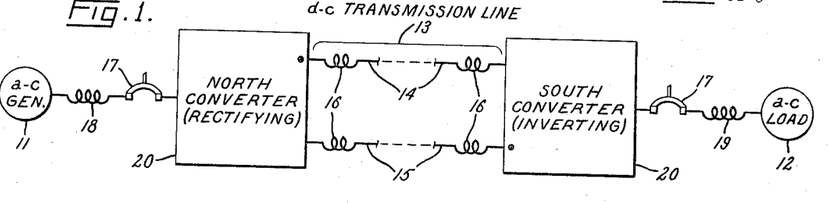
FIG. 1 is a schematic one-line diagram of a typical high-voltage direct-current electric power system in which high-voltage converters embodying my invention can be advantageously used.
Figure 2:
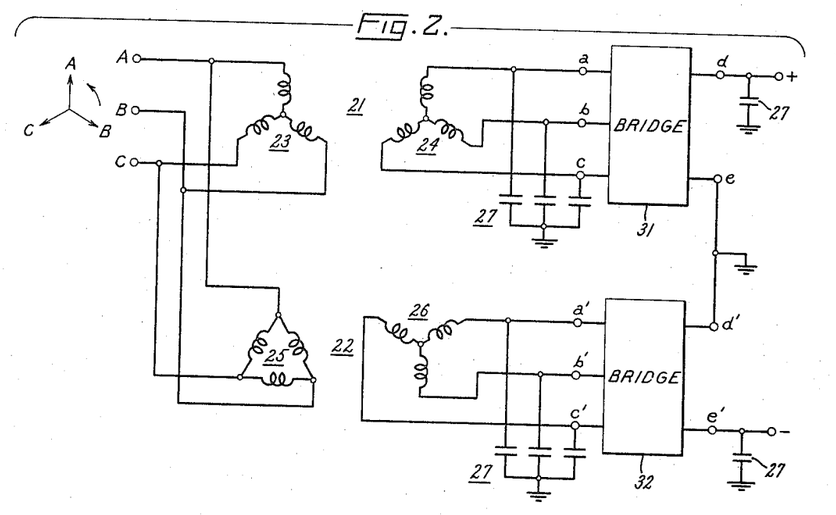
FIG. 2 is a schematic circuit diagram of the North converter shown as a functional block in FIG. 1.
Figure 3:
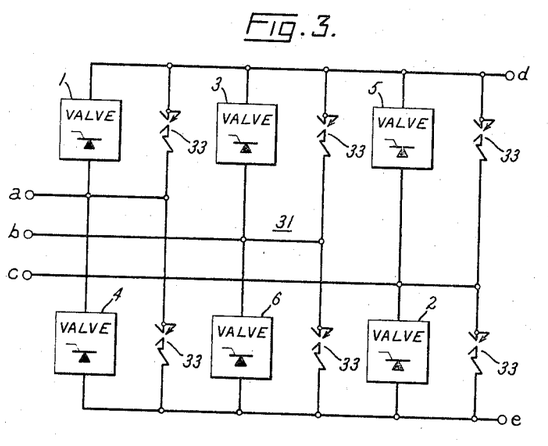
FIG. 3 is a schematic circuit diagram of an arrangement of six identical electric valves comprising one of the high-voltage bridges shown in block form in FIG. 2.

I have included FIGS. 1–3 in the present drawings for the purpose of illustrating one practical application of high voltage solid-state switching circuits embodying my invention. FIG. 1 is a one-line representation of a source 11 ("A-C Gen.") supplying electricity to a load 12 ("A-C Load") via a D-C system comprising a pair of high voltage converter plants 20 interconnected by a D-C transmission line 13. The transmission line 13 comprises a nominally positive D-C conductor 14 paralleled by a relatively negative D-C conductor 15, each conductor having smoothing chokes or reactors 16 in series therewith. The converter at the source terminal of the transmission line is called "North Converter (rectifying)." Its A-C side is coupled to the source 11 by means of a circuit breaker 17, and the A-C system impedance is symbolically shown at 18. The converter at the opposite terminal of the transmission line is called "South Converter (inverting)," and its A-C side is coupled to the load 12 by way of another circuit breaker 17 and A-C system impedance 19.

In practice the electric power system shown in FIG. 1 could be bidirectional. For example, an additional source of power could be coupled to the A-C network fed by the South converter for supplying, on demand, other loads coupled to the A-C side of the North converter. The direction of power in the D-C transmission line is readily reversed by changing the operating modes of the converters at the respective terminals so that the South one acts as a rectifier and the North one acts as an inverter.

FIG. 2 is a schematic circuit diagram of the North converter 20 of the FIG. 1 system. It will be observed that this converter comprises first and second power transformers 21 and 22 in combination with first and second A-C/D-C bridges 31 and 32, respectively. The first transformer 21 has two inductively coupled sets 23 and 24 of three star-connected windings. The windings of one set 23 are connected respectively to three separate terminals A, B, and C which in turn are adapted to be connected to the respective phases of a 3-phase A-C electric power system whose phase rotation is A, B, C. The windings of the companion set 24 are respectively connected to A-C terminals $a$, $b$, and $c$ of the first bridge 31. The bridge 31 has a pair of D-C terminals $d$ and $e$, with the former being connected to the positive D-C terminal of the illustrated converter and the latter being connected to ground. More details of this bridge are shown in succeeding figures.

The second transformer 22 of the North converter comprises a set 25 of three delta-connected windings inductively coupled to a set 26 of three star-connected windings. The windings of the set 25 are respectively connected to the three terminals A, B, and C, while the windings of the companion set 26 are respectively connected to the A-C terminals $a'$, $b'$ and $c'$ of the second bridge 32. With this arrangement, the A-C voltages at the latter terminals will lag those at the corresponding terminals $a$, $b$, and $c$ of the first bridge 31 by a phase angle of 30 electrical degrees. The bridge 32 has a pair of D-C terminals $d'$ and $e'$, the former being connected to ground and the latter being connected to the negative terminal of the illustrated converter. Thus the two bridges 31 and 32 are connected in series with one another between the positive and negative terminals of the converter.

Capacitor symbols 27 have been shown between various conductors and ground in FIG. 2 to represent stray capacitance of the power system in which each of the bridges 31 and 32 is connected. This stray capacitance comes from a number of different sources; for example, the transformer windings; the transformer bushings; and the wall bushings for the D-C terminals of the bridge.

The D-C voltage rating of the FIG. 2 converter depends on the individual ratings of each bridge and the number of bridges in series. Additional transformer-bridge combinations can be cascaded with those shown if desired. If the converter were used solely as a rectifier, the additional bridges could use uncontrolled valves (diodes).

FIG. 3 is a schematic circuit diagram of the bridge 31 of the FIG. 2 converter. This bridge comprises six identical controlled valves 1, 2, 3, 4, 5, and 6 arranged in a 3-phase double-way 6-pulse configuration. Thus the cathodes of the odd-numbered valves are connected in common to the upper D-C terminal $d$ of the bridge, and the anodes of the even-numbered valves are connected in common to the other D-C terminal $e$. The anode of valve 1 and the cathode of valve 4 are both connected to the first terminal $a$ of the 3-phase A-C terminals of the bridge. The anode of valve 3 and the cathode of valves 6 are both connected to the second A-C terminal $b$. The anode of valve 5 and the cathode of valve 2 are both connected to the third A-C terminal $c$. By firing these six valves in their numbered sequence at intervals of 60 electrical degrees, 3-phase electric power supplied to the A-C terminals of the bridge can be converted to D-C power.

The average magnitude of the rectified voltage between the D-C terminals of the bridge 31 is maximum when the firing angle of the valves is zero. By increasing the firing angle to nearly 90 degrees, the D-C voltage can be reduced to zero. Still greater firing angles are used when the bridge is operating in its inverting mode, at which time the potential of terminal $d$ is negative with respect to terminal $e$ and D-C electric power supplied to these terminals is converted by the bridge to 3-phase A-C power.

As is shown in FIG. 3, a suitable voltage surge suppressor 33 is connected across each valve in the bridge 31. The purpose of the suppressor 33 is to protect the associated valve from excessive voltage whenever that valve is in a blocking state.

Figure 4:
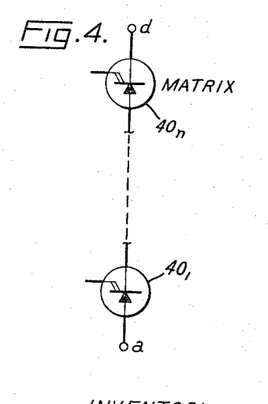
FIG. 4 is a schematic circuit diagram of a string of serially interconnected solid-state switching circuits comprising one of the six high-voltage valves shown in block form in FIG. 3.

The D-C voltage rating of the FIG. 3 bridge depends on the individual voltage rating of each valve. FIG. 4 depicts the first valve 1 which is seen to comprise a series string of at least two identical solid-state switching circuits $40_1$ and $40_n$. Each switching circuit, which is herein referred to as a "matrix," has a predetermined voltage capability (for example, 3,600 volts), and the rating of the valve is therefore a multiple of that capability. Thus the matrix is a basic module or building block that can be used by itself or in series with whatever number of reiterative matrices are required to construct a valve of desired rating.

Figure 5:
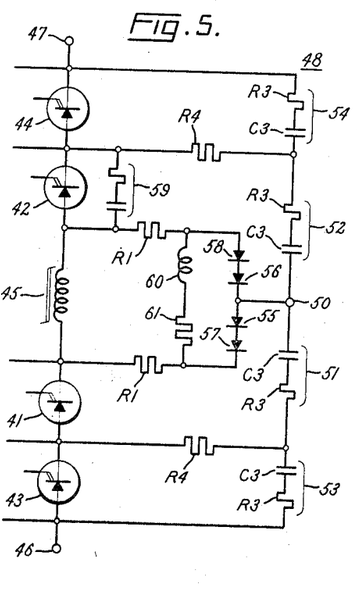
FIG. 5 is a schematic diagram of a switching circuit embodying the commutation transient suppressing means of my invention and comprising one of the reiterative circuits depicted symbolically in FIG. 4.

The details of one of the FIG. 4 matrices are shown in FIG. 5. Here the matrix is seen to comprise a thyristor section 41 connected in series with a main saturable core inductor 45 between circuit anode and cathode terminals 46 and 47, respectively. Preferably a matrix has one or more pairs of duplicate sections or levels of thyristors, with the main inductor 45 being serially connected therebetween. The illustrated matrix actually incorporates two pairs 41, 42 and 43, 44 of thyristor sections, and I contemplate the addition of still other pairs (not shown). The voltage capability of the matrix varies with the number of these sections used.

Each of the serially interconnected thyristor sections 41, 42, 43, and 44 of the matrix comprises at least one high-power SCR. Such solid-state devices were discussed in the introductory portion of this specification. Although not shown in FIG. 5, appropriate heat dissipating means are ordinarily associated with the respective SCR's. At present I prefer to use SCR's having individual blocking voltage ratings of at least 1,800 PRV (peak reverse volts), and consequently the illustrated 4-level matrix may be conservatively rated 3,600 volts. To ensure steady-state and transient voltage sharing among the respective sections of the matrix, these sections are shunted by an R-C bypass network 48 as shown. The SCR's in the four thyristor sections 41–44 are arranged to permit conventional current to pass through the matrix in an upward direction, as viewed in FIG. 5, when they are all triggered to forward conducting states.

Where the current rating desired for the matrix (e.g., 2,000 amperes D-C) exceeds the maximum forward current rating of an individual body of silicon, each thyristor section can be formed by connecting two or more of these elements in parallel with one another inside a common housing, or by electrically paralleling physically separate SCR's. In such a parallel array the respective elements or devices should be selected to turn on in unison and to conduct substantially equal shares of the whole matrix current. An improved SCR well suited for this purpose is disclosed and claimed in a copending application Ser. No. 602,837, McIntyre et al., filed Dec. 19, 1966, and assigned to the assignee of the present application. It will therefore be apparent to those skilled in the art that the singular rectifier symbol with dual gates depicting each of the thyristor sections 41–44 in FIG. 5 is intended to represent an extra high current array of SCR's capable of contemporaneous switching from forward blocking states to substantially equiconducting states.

To condition the matrix for through current conduction, the SCR's in its respective thyristor sections 41–44 are simultaneously triggered or fired by the control circuit shown in FIG. 7 and described hereinafter. Although simultaneously triggered, some of the sections may respond slightly faster than others. In this event, the voltage-dividing bypass network 48 enables the turn-on process successfully to proceed until even the slowest section has attained a forward conducting state.

As shown in FIG. 5, the bypass network 48 comprises four series resistor-capacitor subcircuits 51, 52, 53, and 54 connected across the four thyristor sections 41, 42, 43, and 44, respectively. Each subcircuit comprises a resistor R3 in series with a capacitor C3. The common junction of the subcircuits 51 and 53 is connected to the common junction of the thyristor sections 41 and 43 by way of a resistor R4 of relatively high ohmic value (e.g., 90 ohms), and the common junction of the subcircuits 52 and 54 is similarly connected to the common junction of the thyristor sections 42 and 44. The resistors R4 serve two purposes: (1) to limit the magnitude and rate of rise of current that is contributed by each R-C subcircuit to the associated thyristor section when that section initially switches to its low-resistance forward conducting state, and (2) to limit similarly the current that can initially flow from the external circuit through thyristor sections 43 and 44 if both of these sections were to turn on in advance of the other two sections 41 and 42.

The common junction of subcircuits 51 and 52 forms the midpoint 50 of the bypass network 48. This point is connected directly to the common junction of a pair of feedback diodes 55 and 56 which, in series with additional pairs of diodes 57 and 58 as needed, shunt the main inductor 45 of the matrix. The feedback diodes 55–58 are poled in opposition to the thyristor sections, whereby they present high impedance to forward current flowing through the matrix. More will be said hereinafter about their function in suppressing commutation transients.

The capacitors C3 in the respective subcircuits 51–54 serve the desired purposes of limiting the rise of anode voltage across any thyristor section that turns on slower than others, while at the same time providing a shunt path that will bypass a limited amount of through current and thereby ensure that current in the first-on section is maintained above its holding level. To absorb any short-duration voltage spike that might otherwise appear across whichever thyristor section happens to be the last one to switch to its conducting state, I connect thereacross an additional series resistor-capacitor combination 59 having an RC time constant appreciably shorter than that of the R3–C3 subcircuit. In the FIG. 5 matrix by way of example the additional combination 59 is shown connected across the thyristor section 42 which is assumed to turn on slightly later than its companion sections.

The capacitors C3 in the bypass network 48 also accommodate variations in the recovery characteristics of the separate thyristor sections 41–44. It is unlikely that all of these sections will recover their reverse blocking abilities at precisely the same instant of time at the conclusion of each conducting interval of the matrix. As soon as the first-off section recovers, reverse voltage intended for the entire matrix tends to appear across that one section. However, the capacitors C3 will limit the rise of reverse voltage on the relatively fast recovery sections until the slower thyristor sections in the string recover, and at the same time they provide a shunt path around any section that turns off earlier than others for the necessary reverse recovery current of the last-off section.

The above-summarized voltage equalizing function of the bypass network 48 can be advantageously accomplished for the illustrated matrix by using in each subcircuit a C3 capacitor of approximately 4 microfarads.

The resistors R3 in the respective subcircuits 51–54 of the bypass network serve two desired purposes. At the end of a conducting interval of the matrix, they dampen oscillations between the circuit inductance and the bypass capacitors C3 and thereby limit anode voltage overshoot on the corresponding thyristor sections. In addition, at the beginning of a conducting interval they limit the initial switching current contributed to each thyristor section by the discharge of the associated bypass capacitor C3. However, the ohmic value of each resistor R3 must be kept low enough to avoid imposing excessive anode voltage on either the last-on or the first-off thyristor section in the matrix. I presently prefer to use 12-ohm resistors.

I have previously summarized the manner in which the bypass network 48 enables all four of the serially interconnected thyristor sections 41–44 to switch successfully from their high-resistance forward blocking states to low-resistance conducting states at the beginning of a conducting interval (i.e., at the beginning of a period of commutation, assuming the involved matrix $40_1$ is in the incoming valve). It is nevertheless possible that the individual matrices comprising the whole valve will not switch simultaneously with one another. In this event, the main inductor 45 that is provided in each matrix serves the important purpose of temporarily absorbing the matrix voltage and consequently preserving the desired voltage division among the matrices.

Figure 6:
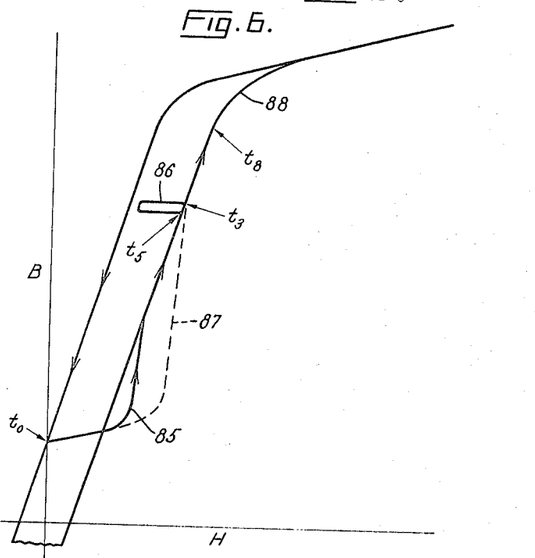
FIG. 6 is a graph of the active portion of the preferred magnetic characteristic of the core of the saturable reactor used in the FIG. 5 circuit.

Each inductor 45 can comprise, by way of example, a 6-turn winding on a saturable magnetic core having a short air gap. The active portion of its preferred magnetization characteristic is shown in FIG. 6, and its operation will now be described.

The main inductor 45 is in an unsaturated, high inductance state so long as the matrix shown in FIG. 5 is not conducting. Before the next commutation period involving this matrix can begin, its thyristor sections 41–45 and those of all of the matrices in series therewith must be turned on. Assuming that all four thyristor sections of the illustrated matrix turn on slightly earlier than those of the other matrices, the proportionate share of the incoming valve voltage originally appearing across the terminals 46 and 47 of this first-on matrix is then sustained by the unsaturated main inductor 45. Hence the matrix terminal voltage cannot collapse prematurely, and the slower matrices of the string will not be subjected to excessive anode voltages. It will now be apparent that the number of feedback diodes 55–58 connected in series across the main inductor 45 in practice is determined by the maximum magnitude of voltage that may be impressed on this inductor. The inductor will subsequently saturate when the time integral of voltage reaches its predetermined magnitude (e.g., 25,000 volt-microseconds).

The feedback diodes 55–58 prevent any undesirable surge of induced voltage at the terminals of the main inductor 45 when the involved matrix is concluding a conducting interval. Near the end of commutation, the magnitude of forward current in the outgoing valve will decrease to a level at which the main inductors in the respective matrices of that valve unsaturate, whereupon further reduction of current tends to generate abnormally high inductor voltage. This is avoided, however, by the feedback diodes which provide a path in which inductor current can coast while the through matrix current proceeds to zero and momentarily reverses to complete the turn-off process. Any electric energy stored in the inductor 45 after the matrix turns off will be dissipated in two duplicate resistors R1 that are connected in series with the feedback diodes 55–58.

In accordance with my invention, the feedback diodes 55–58 are disposed between the two R1 resistors, and a subcombination comprising an auxiliary inductor 60 in series with a resistor 61 is connected across these diodes. Thus, as can be seen in FIG. 5, the main inductor 45 of the matrix is shunted by a parallel circuit that includes the resistors R1 in series with the parallel combination of the diode rectifying means 55–58 and the auxiliary inductor-resistor subcombination 60, 61. The primary function of this particular set of components is to suppress severe commutation transients that can be expected at the beginning of a period of commutation when all matrices in the incoming valve have switched to their forward conducting states. Before describing the parameters and the operating details of my commutation transient suppressing means, brief consideration will first be given to a control scheme that can be used to fire the valve and thereby initiate the commutation period.

Figure 7:
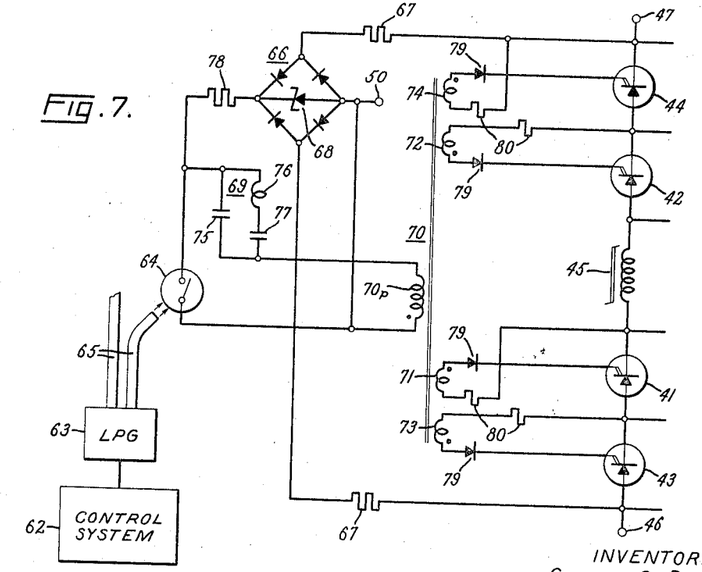
FIG. 7 is a schematic diagram of a collateral circuit that can be used to supply control signals for triggering the FIG. 5 circuit.

Such a scheme has been shown schematically in FIG. 7. Preferably it comprises a suitable control system 62 for cyclically triggering a light pulse generator 63 at a desired firing angle. The light pulse generator 63 includes a common source of light for a plurality of light activated control means 64 that are respectively associated with the plurality of matrices 40$_1$ . . . 40$_n$ comprising one high-voltage valve. The light signal from this common source is transmitted to the various light activated control means via a plurality of light guides 65, only two of which are shown in FIG. 7. The light activated control means 64 for each matrix is part of a local gate drive circuit that is capable of simultaneously applying gating current signal pulses to the gates of selected thyristor sections in the matrix in response to the reception of the light signal. In this manner virtually simultaneous triggering of all of the thyristor sections in the respective matrices of the valve can be achieved. Such an arrangement is not my invention but is the claimed subject matter of a copending patent application Ser. No. 440,261, Mapham, filed Mar. 16, 1965, and assigned to my assignee.

Only one of the local gate drive circuits has been shown in FIG. 7 by way of example. This circuit is energized by the voltage across the associated matrix. It includes a single-phase rectifier bridge 66 whose A-C terminals are connected via a pair of current limiting impedances 67 to the anode and cathode terminals 46 and 47, respectively, of the matrix. A voltage regulating Zener diode 68 is connected between the positive and negative D-C terminals of the rectifier 66, and the latter terminal is connected directly to the midpoint 50 of the bypass network 48 in the matrix. The D-C voltage from the rectifier 66 supplies a pulse shaping circuit which preferably comprises the light activated control means 64 in parallel with the series combination of an L-C subcircuit 69 and a primary winding 70p of a pulse transformer 70 having four secondary windings 71, 72, 73, and 74. The L-C subcircuit 69 comprises a first capacitor 75 shunted by an inductor 76 in series with a second capacitor 77. There is a resistor 78 connected between the pulse shaping circuit and the positive D-C terminal of the rectifier 66.

With this arrangement, the light activated control means 64 is normally open, and the capacitors 75 and 77 are normally charged by the D-C voltage derived by the rectifier 66 from the voltage that appears across the associated matrix during its nonconducting interval. Upon receiving a light signal from the light pulse generator 63, the light activated control means 64 momentarily closes to provide a low resistance-path for capacitor discharge current. The discharge path includes the transformer primary winding 70p, and thus steep wave front control signals of proper polarity, magnitude, and duration are induced in the four transformer secondaries 71–74. These control signals are conductively coupled by means including diodes 79 and resistors 80 to the gate-cathode circuits of the respective thyristor sections 41–44 in the matrix, and the SCR's comprising these sections are consequently triggered to forward conducting states. Typically a 10-microsecond gate pulse will be adequate. This particular gate drive circuit, which forms no part of the present invention, is more fully disclosed and is claimed in a copending patent application filed for B. D. Leete and assigned to my assignee.

With reference again to FIG. 5, a list of parameters for the commutation transient suppression components of my invention will now be set forth for purposes of illustrating its operation. An explanation of relevant factors considered in selecting such parameters will be deferred until later. As was earlier noted, the illustrated matrix is typically assigned a rating of 3600 volts and 2000 amperes D-C. It is assumed that the connected power system has a stray capacitance C of approximately 0.375 microfarad per matrix in the incoming valve, and that the power system has a commutating reactance L of approximately 730 microhenries per matrix.

| Components: | Approximate value |
|---|---|
| Inductor 45 (unsaturated) microhenries (at 60 Hz.) | 200 |
| Inductor 45 (saturated) do | 10 |
| Inductor 60 do | 200 |
| Resistor 61 ohms | 2.5 |
| Resistor R1 (each) do | 2.5 |

Figure 8A:
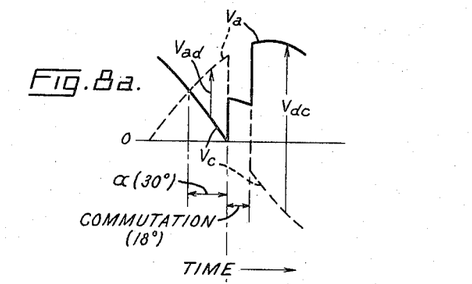
FIG. 8a is a chart of voltage vs. time showing instantaneous voltages of the outgoing and incoming phases at two of the A-C terminals of the FIG. 3 bridge during a portion of a cycle including a period of commutation therebetween.

The operation of the invention may best be understood by referring to FIGURES 8a–10g and their descriptions. FIG. 8a shows alternating voltages $V_a$ and $V_c$ that are applied to the first and third A-C terminals $a$ and $c$, respectively, of the FIG. 3 bridge during a portion of a positive half cycle of $V_a$. At this time valve 1 of the bridge is the incoming valve and valve 5 is the outgoing one. The forward voltage across the incoming valve 1 before it is fired is labeled $V_{ad}$, while the reverse voltage across the outgoing valve after it has turned off is $V_{dc}$. The solid trace in FIG. 8a represents the voltage at the positive D-C terminal $d$ of the FIG. 3 bridge. The rectifying mode of operation with a delay angle of 30 electrical degrees has been shown by way of example, and the resulting commutation period is seen to extend for about 18 degrees (one-tenth of a half cycle).

Figures 8B, 9A:
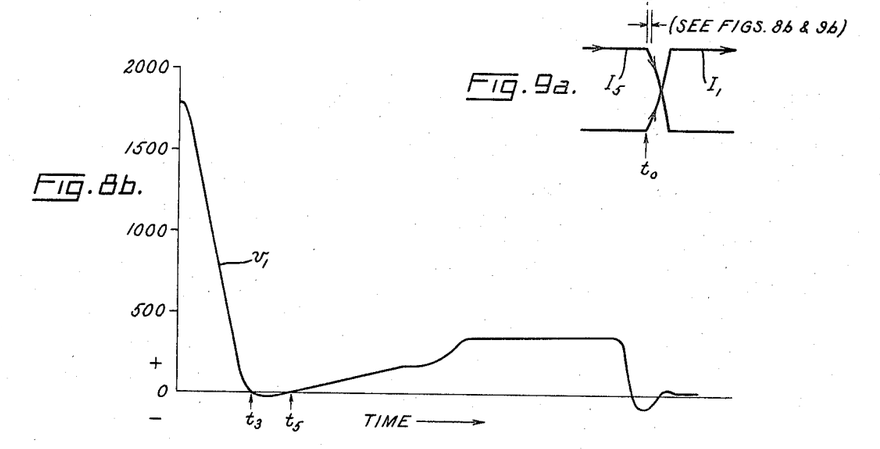
FIG. 9a is a chart of current vs. time showing the currents flowing in outgoing and incoming valves of the FIG. 3 bridge during the same portion of a cycle.
FIGS. 8b and 9b are charts with greatly expanded scales corresponding to the first tenth of the commutation period shown in FIGS. 8a and 9a, respectively.
Figure 9B:
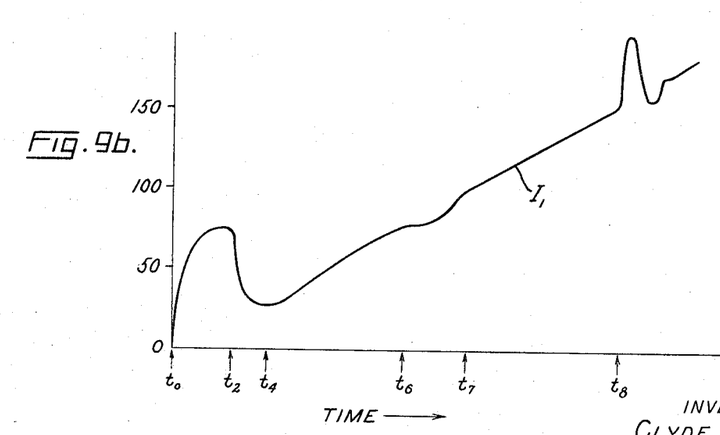

FIG. 9a shows the load currents $I_1$ and $I_5$ that are conducted by the incoming and outgoing valves 1 and 5, respectively, during the same interval of time depicted in FIG. 8a. Time $t_0$ is intended to represent the moment at which all of the thyristor sections in all of the matrices comprising the incoming valve have just attained their low-resistance forward conducting states, whereupon $I_1$ starts flowing and commutation begins. The voltage $v_1$ across one matrix in the incoming valve and the current $I_1$ flowing through it for the first tenth (about 1.8 degrees) of the commutation period are both reproduced with greatly expanded scales in FIGS. 8b and 9b, respectively. The ordinate of FIG. 8b is scaled in volts, and the ordinate of FIG. 9b is scaled in amperes. The first 50 microseconds of FIG. 9b have been further expanded in FIG. 9c in order clearly to depict the transient currents in various parts of the FIG. 5 matrix during this initial phase of commutation.

Figure 9C:
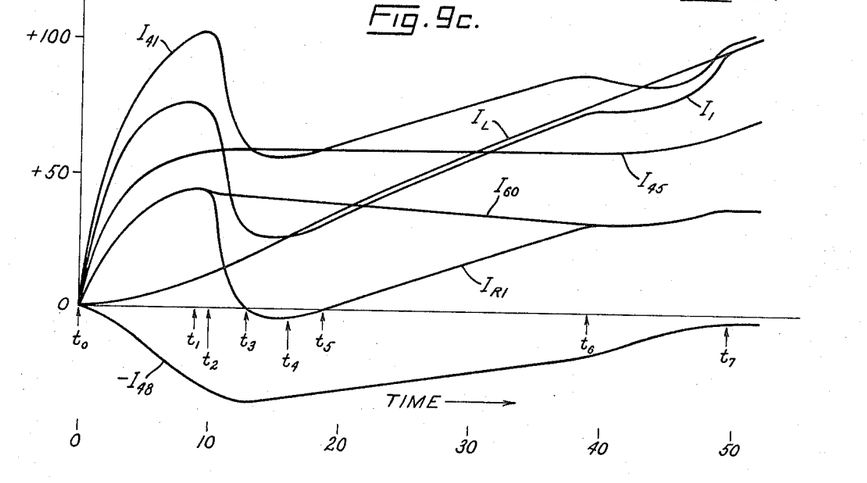
FIG. 9c is another current vs. time chart, with further expanded scales, depicting for a very short span of time (about 50 microseconds) at the beginning of commutation the transient currents in various parts of a FIG. 5 circuit connected in the high-voltage string of circuits (FIG. 4) comprising the incoming valve.
Figure 10A:
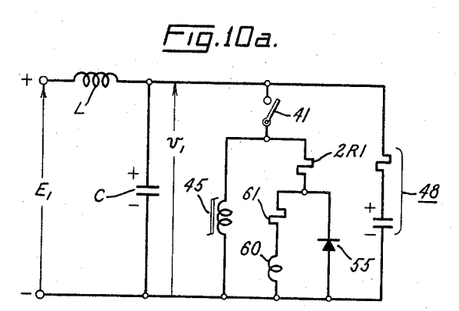
FIGS. 10a–10g are equivalent circuit diagrams illustrating schematically the operation of my invention at successive points of interest during the time represented in FIG. 9b.

To facilitate the explanation of the operation of my invention, the following description of FIGS. 8b, 9b, and 9c will be accompanied by references to a series of equivalent-circuit diagrams shown in FIGS. 10a to 10g. The latter figures depict conditions in a matrix of the incoming high-voltage valve 1 at successive points of interest. FIG. 10a schematically illustrates the conditions immediately before time $t_0$. The matrix has been shown in simplified form as a perfect switch 41 in series with a saturable core main inductor 45 which is shunted by a parallel circuit comprising feedback diode 55 connected in parallel with the series L–R subcombination 60, 61 and in series with resistance 2R1. There is an equivalent R-C bypass network 48 in parallel relationship with the switch 41. The simplified matrix is now blocking its proportionate share $v_1$ of the forward voltage $V_{ad}$ impressed on the incoming valve. Since the outgoing valve 5 is conducting, its impedance is properly neglected. The inductance symbol L represents the commutating reactance effectively in series with the matrix, half of this reactance being contributed by the incoming phase and the other half by the outgoing phase. In FIG. 10a one matrix's share of phase-to-phase A-C system voltage is labeled $E_1$, and for $\alpha=30°$ both $E_1$ and $v_1$ will have attained approximately 1800 volts (one-half maximum) at $t_0$. The capacitor C represents, on a per matrix basis, the equivalent stray capacitance between the phase conductors involved.

Figure 10B:
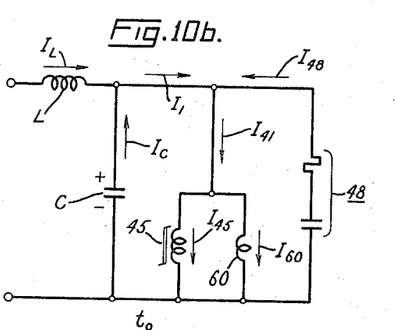

At time $t_0$ the perfect switch 41 is closed, and the conditions shown in FIG. 10b obtain. The whole voltage $v_1$ is initially absorbed by the unsaturated main inductor 45 and the parallel auxiliary inductor 60. For awhile the resistor 61 and the two resistors R1 that are in series with the inductor 60 have no appreciable effect on circuit operations. This is true because the total resistance of these resistors has an underdamping ohmic value. By "underdamping" value I mean that the sum of the resistances of 61 and 2R1 is substantially less than twice the square root of $L2/C1$ where L2 is the inductance in microhenries of the auxiliary inductor 60 and C1 is the capacitance in microfarads of the per matrix stray capacitance of the connected system. As a result the currents $I_{45}$ and $I_{60}$ in the respective components 45 and 60 rise as shown in FIG. 9c, and the magnitude of $I_{60}$ attains a peak at $t_1$.

The inductors 45 and 60 have sufficient inductance to keep the rate of rise of thyristor anode current $I_{41}$ within safe limits during the time interval $t_0$–$t_1$. It is during this relatively short interval that the stray capacitance (C) gives up almost all of its stored energy and contributes its highest magnitude of discharge current ($I_c$) to the matrix. ($I_c$) is not shown in FIG. 9c but of course is equal to the difference between the through matrix current $I_1$ and the current $I_L$ in the commutating reactance L. At the same time another substantial component of anode current $I_{41}$ is being supplied by the discharge current $I_{48}$ from the equivalent capacitor of the bypass network 48 in the matrix. (The negative of $I_{48}$ is shown in FIG. 9c for purposes of clarity.)

At the time $t_1$, the rate of change of $I_{60}$ is zero and hence the voltage across the auxiliary inductor 60 has fallen to zero. Now all of the remaining forward voltage $v_1$ on the matrix appears across the parallel combination of the unsaturated main inductor 45 and the resistors 2R1 and 61. Next $I_{60}$ tends to decrease in magnitude, and a sustaining voltage of opposite polarity is generated by the auxiliary inductor 60. Very shortly after $t_1$, this voltage will exceed the voltage drop across the resistor 61 by a magnitude that is just high enough to forward bias the rectifying means 55, whereupon, at time $t_2$, the latter element becomes operative to provide a relatively low-impedance path across the subcombination comprising inductor 60 and resistor 61. So long as 55 is conducting, the voltage thereacross can be neglected, and the main inductor 45 is effectively shunted by only the remaining resistance 2R1. While there is current circulating in the loop comprising the auxiliary inductor 60, the diode 55, and the resistor 61, the auxiliary inductor is able to maintain its current $I_{60}$ nearly constant and energy that was previously absorbed by it is progressively dissipated in the resistor 61.

Figure 10C:
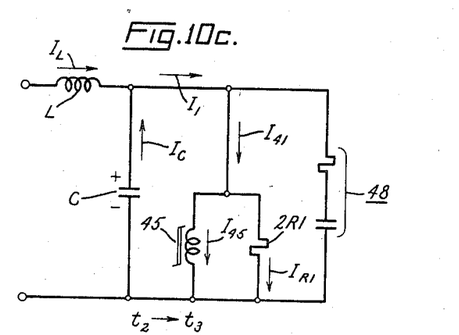
Figure 10D:
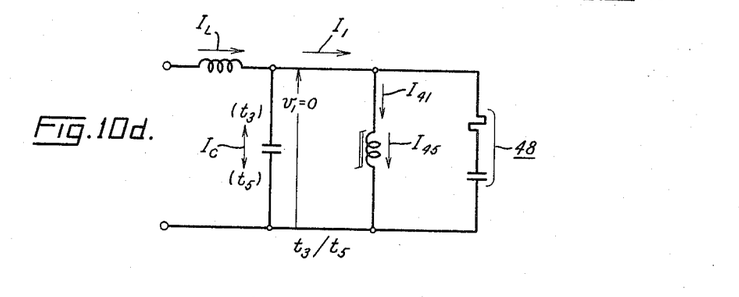

FIG. 10c illustrates the condition of the matrix from time $t_2$ to time $t_3$. It is during this interval that the stray capacitance C of the incoming phase completes its discharge, and $t_3$ depicts the moment when $v_1$ falls to zero (see FIGS. 8b and 10d). Concurrently the voltage drop across the equivalent resistor of the bypass network 48 attains a magnitude equal to that of the capacitor voltage in this circuit. At about the same time $I_{48}$ reaches its maximum magnitude.

As is shown in FIG. 9c, the magnitude of current $I_{R1}$ in the resistance 2R1 paralleling the main inductor 45 has rapidly decayed to zero during the $t_2$–$t_3$ interval, and the thyristor anode current $I_{41}$ has been correspondingly reduced to the level of $I_{45}$. The main inductor is not yet saturated, but a substantial portion of its dynamic magnetization curve 85 has now been traversed to approximately the point marked $t_3$ in FIG. 6. (The width of the FIG. 6 hysteresis loop is exaggerated for purposes of illustration.)

Figure 10E:
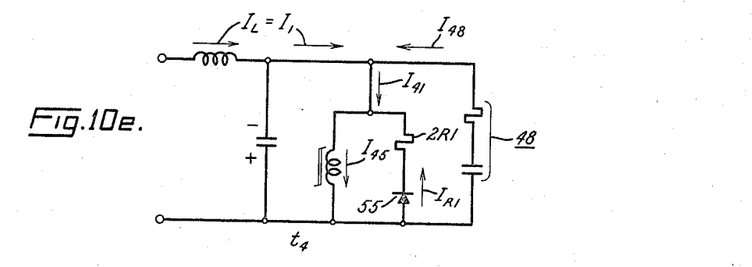

The sum of the resistances of the two R1 resistors is selected to have an overdamping ohmic value, thereby forestalling continuance of oscillations between the stray capacitance C and the main inductor 45 after time $t_2$. By "overdamping" value I mean that this sum is substantially less than one-half the square root of $L1/C1$, where L1 is the inductance in microhenries of the unsaturated main inductor and C1 is the capacitance in microfarads of the per matrix stray capacitance. As a result, the stray capacitance C subsequently recharges to an opposite-polarity voltage peak that is relatively small. This occurs at time $t_4$, and since the rate of change of $-v_1$ is then zero, $I_c$ is zero and $I_1$ equals $I_L$. As is indicated in FIG. 10e, the current $I_{R1}$ in the resistance 2R1 has now reversed its direction and is flowing through the forward biased rectifying means disposed in parallel with the auxiliary inductor 60. $I_{41}$ is of course equal to $I_{45}$ minus $I_{R1}$.

It is important to limit the maximum level and the duration of negative voltage on the stray capacitance to values that are insufficient to drive thyristor anode current $I_{41}$ below its given holding level. Otherwise at least one thyristor section might revert to its non-conducting (blocking) state and thereby interfere with the valve switching process. By using the particular parameters set forth herein by way of illustration, my commutation transient suppression means accomplishes this desired result with an abundant margin of safety. In FIG. 9c at time $t_4$ the magnitude of $I_{R1}$ (which is equal to the maximum level of negative $v_1$ divided by the resistance of 2R1) is seen to be far smaller than the magnitude of $I_{45}$, and consequently there is an ample amount of forward current $I_{41}$ still flowing through the thyristor sections of the matrix. Note that successful switching would be obtained even if the through matrix current $I_1$ were to oscillate to zero, in which event the bypass network 48 will supply sufficient current to keep the thyristor sections on.

By the time the next point of interest ($t_5$) is reached, the stray capacitance C has given up its negative charge and the voltage $v_1$ is again zero. See FIG. 10d. Due to the reversal of polarity of the stray capacitance voltage during the interval $t_3$–$t_5$, the main inductor 45 has been subjected to a relatively negative voltage and its current has gone through the minor loop 86 shown in FIG. 6. After time $t_5$ the capacitance recharging current $I_c$ will be supplied from the A-C system, and the matrix current $I_1$ will be correspondingly lower than $I_L$.

Figure 10F:
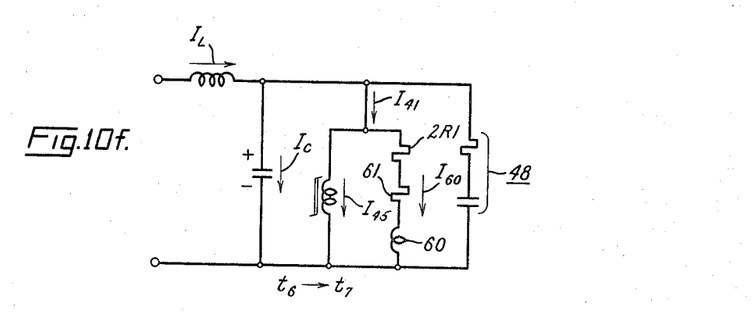

During the next interval $t_5$–$t_6$, the matrix condition is the same as shown in FIG. 10c except for $I_c$ which is now flowing in the opposite direction. The magnitude of $V_1$ (and hence the magnitude of $I_{R1}$) increases as the stray capacitance regains positive charge, and the matrix current $I_1$ rises at a rate determined principally by the commutating reactance L. The time at which $I_{R1}$ attains the level of $I_{60}$ is noted in FIG. 9c as $t_6$, and at this point the rectifying means 55 stops conducting. Consequently, as is shown in FIG. 10f, the main inductor 45 is again effectively shunted by a parallel circuit comprising the inductance-resistance subcombination 60, 61 in series with the resistor 2R1.

From time $t_6$ to time $t_7$, the stray capacitance is recharged to a level at which $v_1$ is related to $E_1$ by approximately the same ratio that relates the inductance (L1) of the main inductor 45 to the sum of this inductance plus that of the commutating reactance L. Thereafter the charging current $I_c$ is negligible, and the matrix current $I_1$ will be essentially equal to $I_L$. Now $I_1$ continues rising at a lower rate determined by $L+L1$, and the magnitude of $I_{45}$ proceeds to change at the same rate which is substantially constant.

Figure 10G:
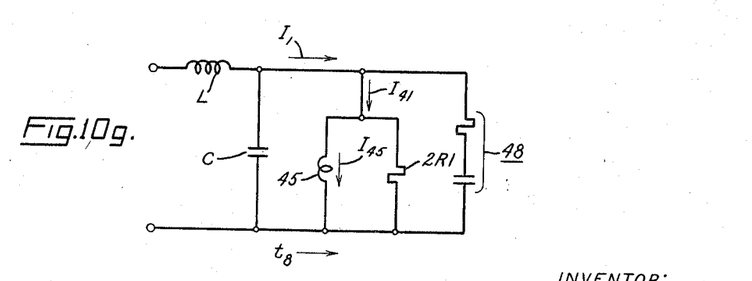

The final point of interest is the moment $t_8$ when the time integral of the voltage $v_1$ impressed on the main inductor 45 reaches the magnitude at which this component is designed to begin saturating. When saturated, the main inductor presents a relatively low inductance (e.g. five percent of L1) in the path of $I_1$, and the equivalent circuit is as shown in FIG. 10g. This condition subsists throughout the remainder of the commutation period. At the same time current $I_{60}$ in the auxiliary inductor 60 has resumed circulating through diode 55 and resistor 61, and the latter element ultimately dissipates the energy remaining in the auxiliary inductor.

The $v_1$ and $I_1$ transients experienced by the illustrated matrix on the occasion of the saturation of its main inductor 45 are illustrated in FIGS. 8b and 9b. It will be observed that the saturating time $t_0$–$t_8$ is inversely related to the sine of the delay angle $\alpha$ at which the valve is fired. For a maximum delay angle of 90 degrees, the magnitude of $v_1$ at $t_0$ is 3,600 volts, the quantity of volt-microseconds to which the main inductor 45 is subjected by the time point $t_3$ is reached will be approximately twice that shown in FIG. 8b, and consequently saturation will actually occur during the ensuing time interval $t_5$–$t_6$. In this case the dynamic magnetization curve of the main inductor will be approximately as shown by the broken line 87 in FIG. 6.

There is a possibility that the transition from unsaturated to saturated states by the main inductor 45 in each matrix will not precisely coincide with similar transitions by the corresponding components in all of the other matrices of the incoming valve. If the illustrated inductor 45 were to begin saturating in advance of others, it will nevertheless continue to sustain some of its share of the valve voltage while the others catch up and thereby to absorb a portion of the energy which is then stored in the stray capacitance of the connected system. This is so because its current $I_{45}$ is able to rise faster than the through matrix current $I_1$ (which continues to be limited by the still unsaturated main inductors of companion matrices), whereby the rounded transitional section 88 of the inductor's magnetization curve (FIG. 6) will be traversed at an appropriately increasing rate of change to prevent $v_1$ from dropping too abruptly. The extra current component required by the early saturating inductor is diverted or shifted from the parallel path provided by resistance 2R1. This shifting of current is not impeded by the auxiliary inductor 60, since the rectifying means 55 readily accepts an equal amount of current and thereby enables $I_{60}$ to continue flowing without diminution.

On the other hand, if the main inductors of the companion matrices were to begin to saturate before point $t_8$ is reached by the illustrated matrix, $I_1$ will rise faster than $I_{45}$. This enables current in the saturating inductors to increase at rates that progressively increase as required to keep the respective voltages on these inductors from prematurely collapsing, whereby the matrix having the last saturating inductor is not subjected to the whole valve voltage. In this case the path paralleling the main inductor 45 carries the extra current resulting in the latter matrix, and any voltage increase on this inductor causes it to proceed more rapidly to saturation. Because of the voltage dropped across the two R1 resistors in the parallel path, the reverse voltage impressed on the feedback diodes 55–58 will be lower than the main inductor voltage and will not exceed their blocking ratings.

The main inductor 45 of the FIG. 5 matrix remains saturated throughout the forward conducting interval of the valve until near the end of its next commutating period. Now valve 1 is the outgoing one, and the current in each matrix is depressed by line voltage commutation to a level at which the main inductor 45 begins to desaturate. Through matrix current will continue rapidly decaying to zero and will momentarily reverse, thereby successfully turning off the respective thyristor sections 41–44 of the matrix. However, the magnitude of forward current in the unsaturated inductor 45 tends to decrease more slowly, and this component generates a sustaining voltage that forward biases the parallel rectifying means. Now current can coast in the loop comprising the main inductor 45, the feedback diodes 55–58, and the two resistors R1 until the latter elements ultimately dissipate the energy remaining in the main inductor. When the main inductor ceases to conduct current, its saturable core automatically resets.

Some additional factors in selecting parameters will now be appreciated. The inductors 45 and 60 need to have sufficiently high inductance values to limit the initial $di/dt$ as previously explained. However, to an extent not inconsistent with this criterion, low inductances are desired, particularly in the main inductor 45 when saturated, in order to minimize power losses in the valves due to switching. The lower the inductance of 45, the less power is lost in the outgoing valve at the end of commutation. Another advantage of a relatively low net inductance is the resulting short time constant of the initially oscillatory circuit (FIG. 10b), whereby anode current will rise well above its holding level while the control signal that initiated conduction is still effective, and the commutation transients will be quickly suppressed without seriously interfering with the timing of valve firing. I presently prefer to use an auxiliary inductor 60 having an inductance no more than twice nor less than half the unsaturated inductance of the main inductor 45.

The resistors R1 and 61 need to have relatively low ohmic values for reasons previously explained. However, the resistor 61 should have sufficient resistance in relation to the inductance of the auxiliary inductor 60 to ensure that the maximum energy initially absorbed by this inductor will be fully dissipated by the time the valve conducting interval ends. Similarly, the resistors R1 should have sufficient resistance in relation to the unsaturated inductance of the main inductor 45 to ensure that the maximum energy remaining in 45 at the end of a conducting interval will be fully dissipated before the next conducting interval begins. Furthermore, too low an ohmic value of the R1 resistors results in the inefficient dissipation of power as current decreases in the outgoing valve near the end of each conducting interval and adversely increases the size and expense of these resistors. The latter resistors also affect the magnitude of $-I_{RL}$ (FIG. 10e) which must be less than $I_{45}$ at time $t_4$.

While an operative matrix might be constructed without the L–R subcombination 60, 61, the latter elements serve several useful purposes. The auxiliary inductor 60 will absorb and the resistor 61 will subsequently dissipate a substantial portion of the energy initially stored in the stray capacitance of the system, and this amount of energy is therefore not available to contribute to the reversal of stray capacitance voltage during the time interval $t_2$–$t_4$. As a result, the resistors R1 can have higher resistance values than would otherwise be practical. This effects economies not only with respect to the size and cost of these resistors but also with respect to the feedback diodes 55–58 whose surge current requirements are consequently reduced. Furthermore, the availability of the auxiliary inductor 60 as a current source at time $t_8$ enables $I_{45}$ to increase at a different rate from $I_1$, whereby the main inductors of the respective matrices do not need to be matched with as high a degree of precision in order to ensure satisfactory voltage sharing during their transitions from unsaturated to saturated states.

High-voltage solid-state converters are made practical by using valves comprising thyristor sections in combination with commutation transient suppression means in accordance with my invention. When each valve is switched to its conducting state there is an unavoidable oscillation between its inductive components and the stray capacitance of the connected system, but my commutation transient suppression means so limits and accommodates this oscillation that forward current in the thyristor sections of the valve never falls below the critical holding level. The stored energy of the stray capacitance is safely dissipated without voltage overshoot on any matrix of the valve. In addition, the transient voltage on each valve due to switching is sufficiently limited to prevent repetitive firing of the surge suppressor 33 in parallel therewith.

While I have shown and described the preferred form of my invention by way of illustration, many modifications will occur to those skilled in the art. I therefore contemplate by the claims which conclude this specification to cover all such modifications as fall within the true spirit and scope of my invention.

What I claim as new and desire to secure by Letters Patent of the United States is:

1. In combination with a solid-state switching circuit that includes a saturable core inductor in series with a series of thyristor sections each of which has at least one semiconductor controlled rectifier arranged to conduct electric current in a given direction through said circuit when triggered, said switching circuit beng adapted to be connected to an A-C electric power system having predetermined stray capacitance:
    (a) means for substantially simultaneously triggering the controlled rectifiers of all of said sections;
    (b) means for effectively shunting said inductor with a resistance-inductance circuit the total resistance of which has an underdamping ohmic value; and,
    (c) means operative after the magnitude of current flowing through said shunting means attains a peak for providing a relatively low-impedance path across part of said resistance-inductance circuit, said part including the inductance of this circuit and a predetermined portion of said resistance, whereupon
        (i) electric energy stored in said inductance is dissipated in said portion of said resistance, and
        (ii) said saturable core inductor is effectively shunted by only the remaining resistance which has an overdamping ohmic value.

2. An improved electric current switching circuit including, in series, a main saturable core inductor and at least one thyristor section comprising a controlled rectifier that will permit current to pass through said circuit in a given direction when triggered from a relatively high-resistance nonconducting state to a low-resistance conducing state, wherein improvement comprises shunting the main inductor with a parallel circuit including:
    (a) a subcombination comprising a first resistor and an auxiliary inductor connected in series with each other;
    (b) rectifying means connected in parallel with said subcombination;
    (c) at least one other resistor; and
    (d) means for connecting across said main inductor said other resistor in series with the parallel combination of said rectifying means and said subcombination,
    (e) said rectifying means being poled in opposition to said controlled rectifier, whereby said rectifying means presents a high impedance to circuit current flowing in said given direction.

3. The switching circuit of claim 2 in which there are at least two thyristor sections having simultaneously triggered controlled rectifiers in series with one another.

4. The switching circuit of claim 3 in which said main inductor is serially connected between said thyristor sections.

5. In combination with the switching circuit of claim 3, a bypass network comprising at least two series resistor-capacitor subcircuits, and means for connecting said subcircuits across said thyristor sections, respectively.

6. An improved solid-state switching circuit including, in series and in the named order, a first thyristor section, a main saturable core inductor, and a second thyristor section, said thyristor sections comprising controlled rectifiers adapted to be triggered substantially simultaneously to conducting states in which they permit electric current to pass through said circuit in a given direction, wherein the improvement comprises shunting the main inductor with a parallel circuit including:
    (a) a subcombination comprising a first resistor and an auxiliary inductor connected in series with each other;
    (b) at least one pair of diodes connected in series with each other and in parallel with said subcombination;
    (c) second and third duplicate resistors; and
    (d) means for connecting across said main inductor said second and third resistors in series with the parallel combination of said subcombination and said pair of diodes, with said parallel combination being disposed between said second and third resistors,
    (e) said diodes being poled in opposition to said controlled rectifiers, whereby said diodes present high impedance to circuit current flowing in said given direction.

7. The switching circuit of claim 6 in which the thyristor sections are shunted by a voltage dividing bypass network comprising first and second series resistor-capacitor subcircuits connected across said first and second thyristor sections, respectively, the common junction of said subcircuits being connected directly to the common junction of said diodes.

8. A solid-state switching circuit comprising:
    (a) first and second serially interconnected thyristor sections comprising controlled rectifiers adapted to be simultaneously triggered to conducting states in which they permit electric current to pass through said circuit in a given direction;
    (b) a saturable core inductor connected between said first and second thyristor sections;
    (c) at least one pair of diodes connected in series with each other;
    (d) means including first and second duplicate resistors for connecting said pair of diodes across said inductor, with said diodes being disposed between said first and second resistors and being poled in opposition to said controlled rectifiers, whereby said diodes present high impedance to circuit current flowing in said given direction;
    (e) a voltage dividing bypass network comprising first and second series resistor-capacitor sub-circuits; and
    (f) means for connecting said first and second sub-circuits across said first and second thyristor sections, respectively, with the common junction of said sub-circuits being connected directly to the common junction of said diodes.

9. The switching circuit of claim 8 in which each of said sub-circuits has substantially the same predetermined RC time constant, and in which an additional series resistor-capacitor combination is connected directly across whichever thyristor section is slower to switch to its conducting state, the RC time constant of said additional combination being appreciably shorter than said predetermined time constant.

10. An electric valve comprising a first solid-state switching circuit constructed in accordance with the terms of claim 8 in series with a second solid-state switching circuit also constructed in accordance with the terms of claim 8.

11. An improved electric current switching circuit including, in series, a main saturable core inductor (45) and at least one thyristor section (41) comprising a controlled rectifier that will permit current to pass through said circuit in a given direction when triggered from a relatively high-resistance blocking state to a low-resistance conducting state, said main inductor being shunted by a feedback diode (55) poled in opposition to said controlled rectifier, wherein the improvement comprises:
  (a) a subcombination comprising
    (i) and auxiliary inductor (60) and
    (ii) a first resistor (61) in series with said auxiliary inductor,
  said subcombination being connected in parallel with said diode; and
  (b) means including at least one other resistor (R1) for connecting the parallel combination of said diode and said subcombination across said main inductor.

12. The switching circuit of claim 11 in which the unsaturated inductance of said main inductor (45) has a predetermined value (in microhenries), the saturated inductance value of said main inductor is no more than approximately five percent of its unsaturated value, the inductance value of said auxiliary inductor (60) is approximately the same as the unsaturated inductance value of said main inductor, the resistance value (in ohms) of said first resistor is approximately one-fifth of the square root of the inductance value of said auxiliary inductor, and the resistance value of said connecting means is approximately twice that of said first resistor.

13. The switching circuit of claim 11 in which there are a plurality of thyristor sections (41, 42 . . . ) each of which comprises at least one controlled rectifier capable of blocking more than 500 volts and of conducting more than 50 amperes.

References Cited

UNITED STATES PATENTS

| | | | |
|---|---|---|---|
| 3,122,695 | 2/1964 | Meissen | 321—47 XR |
| 3,158,799 | 11/1964 | Kelly et al. | 321—47 XR |
| 3,278,827 | 10/1966 | Corey et al. | 321—44 |
| 3,287,576 | 11/1966 | Motto | 307—252 |
| 3,351,841 | 11/1967 | Lipman et al. | 321—45 |
| 2,247,057 | 6/1941 | Hull | 321—27 |
| 2,834,932 | 5/1958 | Dewey | 321—48 |
| 2,982,904 | 5/1961 | Koppelmann | 321—11 |
| 3,100,268 | 8/1963 | Foote | 307—237 |

JOHN F. COUCH, *Primary Examiner.*

WM. SHOOP, JR., *Assistant Examiner.*

U.S. Cl. X.R.

321—5, 45